US009390275B1

(12) United States Patent
Tracey et al.

(10) Patent No.: US 9,390,275 B1
(45) Date of Patent: Jul. 12, 2016

(54) SYSTEM AND METHOD FOR CONTROLLING HARD DRIVE DATA CHANGE

(71) Applicant: Centurion Holdings I, LLC, Fenton, MO (US)

(72) Inventors: William R. Tracey, St. Louis, MO (US); Qin Zhang, St. Louis, MO (US); John Modica, St. Louis, MO (US)

(73) Assignee: Centurion Holdings I, LLC, Fenton, MO (US)

( * ) Notice: Subject to any disclaimer, the term of this patent is extended or adjusted under 35 U.S.C. 154(b) by 0 days.

(21) Appl. No.: 14/606,838

(22) Filed: Jan. 27, 2015

(51) Int. Cl.
 *G06F 17/30* (2006.01)
 *G06F 21/60* (2013.01)
 *G06F 21/80* (2013.01)
(52) U.S. Cl.
 CPC ............. *G06F 21/60* (2013.01); *G06F 21/805* (2013.01)
(58) Field of Classification Search
 CPC ............ G06F 1/3221; G06F 17/30144; H04L 67/1095
 See application file for complete search history.

(56) References Cited

U.S. PATENT DOCUMENTS

| 6,247,152 | B1 * | 6/2001 | Russell | G11B 19/04 711/112 |
| 6,289,462 | B1 | 9/2001 | McNabb et al. | |
| 6,687,846 | B1 * | 2/2004 | Adrangi | G06F 11/0709 714/17 |
| 6,766,478 | B2 | 7/2004 | Leung | |
| 6,904,599 | B1 | 6/2005 | Cabrera et al. | |
| 7,010,807 | B1 | 3/2006 | Yanovsky | |
| 2004/0133790 | A1 * | 7/2004 | Hensley | G06F 21/6209 713/191 |
| 2004/0148478 | A1 | 7/2004 | Leung | |
| 2005/0138370 | A1 * | 6/2005 | Goud | G06F 21/57 713/164 |
| 2009/0055683 | A1 * | 2/2009 | Wells | G06F 21/57 714/15 |
| 2010/0250488 | A1 * | 9/2010 | Mayer | G06Q 10/10 707/609 |
| 2011/0185190 | A1 * | 7/2011 | Berengoltz | G06F 21/6218 713/189 |
| 2012/0311375 | A1 * | 12/2012 | Shah | H04L 61/1511 714/4.11 |
| 2013/0191381 | A1 * | 7/2013 | Jin | G06F 17/30964 707/728 |

\* cited by examiner

*Primary Examiner* — Josnel Jeudy
(74) *Attorney, Agent, or Firm* — David H. Chervitz

(57) ABSTRACT

A system for controlling hard drive data change is disclosed which comprises a hard drive having a first volume and a second volume, the first volume for storing data of a first type, the second volume for storing data of a second type, the hard drive being connected to a computer system which restarts the hard drive and an application for running on the computer system for determining whether data of the second type is attempting to change data of the first type to store data of the second type in the second volume, for determining whether data of the second type has been stored in the second volume, and for erasing data of the second type that has been stored in the second volume when the hard drive is restarted by the computer system.

20 Claims, 5 Drawing Sheets

SYSTEM AND METHOD FOR CONTROLLING HARD DRIVE DATA CHANGE

BACKGROUND

This disclosure relates to a system and method for protecting a hard drive, and more particularly, to a system and method for controlling hard drive data change. This disclosure also relates to a system and method for controlling hard drive data change from an unauthorized change in data, in a program, or in a desired configuration.

Computers, computer networks, and the Internet are pervasive in current technology and society. Individuals, businesses, and other entities rely on the Internet to perform various transactions, applications, and services. The Internet provides an efficient, cost effective, and valuable platform for such transactions, applications, and services. However, the potential for a security breach which could cause damage to an individual or a business is an important consideration that needs to be addressed. For example, theft or corruption of data is possible if a system is not properly protected. Once data is corrupted, it may take a large amount of time, effort, and expense to solve the problem. As can be appreciated, corruption of data should be avoided or eliminated.

It is also known that computers may become corrupted by a computer virus that is unknowingly downloaded through the Internet. A computer virus is a program designed to corrupt or change the computer without the knowledge of the operator or user of the computer. Once a computer virus is loaded on a computer the virus may spread to other computers to corrupt the other computers. Some examples of a virus are malware, spyware, key loggers, adware, malicious scripts, and Trojan horses. It is also possible that a virus may be implemented knowingly by an individual having malicious intent to cause destruction to a computer system or network. It would be desirable to prevent unauthorized or otherwise unwanted changes to certain data in a computer.

In order to prevent changes to data, programs, or configurations, several methods have been developed. One method is to provide a "firewall" to protect a computer network that has access to the Internet. The firewall establishes a barrier between a trusted and secured network and another network such as the Internet. Although firewalls are used to protect computer networks, the firewalls are still subject to being defeated by an attack. Once the firewall is defeated, it is possible that one computer on the network may become infected which in turn will infect the other computers on the network. Another method used in an attempt to protect a computer is an anti-virus software application that analyzes software to determine if a virus is present or hidden therein. Anti-virus software typically has a set of virus characteristics that the software searches to determine if a virus is present. However, a problem with anti-virus software is that a new virus not having a virus characteristic will be able to circumvent the anti-virus software. If the anti-virus software is not continuously updated with a new set of virus characteristics then a virus will not be detected. Another solution has been to impose security features which require proof of authorization or approval. For example, a password or a physical key may be used to be able to make a change to data, programs, or configurations. Unfortunately, this solution can be problematic and burdensome to the computer user. In particular, the password may be forgotten or lost and the physical key may be misplaced.

Furthermore, information technology (IT) managers or personnel are confronted with computer problems or issues on a daily basis. Computer users may make unauthorized or unwanted changes to their computer systems in which the IT department must resolve. The IT department may need to upgrade one or more computers with new software versions or patches. If the software upgrade has a problem then the IT department may need to remove the upgrade to have the computer revert to an initial setting. As can be seen, IT professionals face a number of problems in incorporating new systems and technologies.

Therefore, it would be advantageous to have a system and a method that controls a hard drive from an unauthorized or authorized change in data, in a program, or in a desired configuration. For example, it would be desirable to have a system and method that controls a hard drive and allows the hard drive to be restored to an initial condition or configuration. It would also be advantageous to have a system and method for controlling a hard drive that prevents having data being written to a protected zone, portion, or session of a hard drive. With the protection provided by the present disclosure, a computer user can safely connect to a network such as the Internet, download files, expose the computer to viruses such as malware, spyware, key loggers, worms, adware, and Trojan horses, experiment with different system settings, and otherwise expose the computer's configuration to change without fear of permanent damage to the computer.

SUMMARY

In one form of the present disclosure, a system for controlling hard drive data change comprises a hard drive having a first volume and a second volume, the first volume for storing data of a first type, the second volume for storing data of a second type, the hard drive being connected to a computer system which restarts the hard drive and an application for running on the computer system for determining whether data of the second type is attempting to change data of the first type to store data of the second type in the second volume, for determining whether data of the second type has been stored in the second volume, and for erasing data of the second type that has been stored in the second volume when the hard drive is restarted by the computer system.

In another form of the present disclosure, a system for controlling hard drive data change comprises a hard drive having a first directory for storing data of a first type, a second directory for storing data of a second type, the hard drive being connected to a computer system which restarts the hard drive, an application for running on the computer system for determining whether data of the second type is attempting to change data of the first type to store data of the second type in the second directory, for determining whether data of the second type has been stored in the second directory, and for erasing data of the second type that has been stored in the second directory when the hard drive is restarted by the computer system, and a directory protection module for allowing the computer system to save data of the first type to the first directory permanently.

In yet another form of the present disclosure, a system for controlling hard drive data change is disclosed which comprises a hard drive having a first volume and a second volume, the first volume for storing data of a first type, the second volume for storing data of a second type, the hard drive being connected to a computer system which restarts the hard drive and an application for running on the computer system for determining whether a trusted session is being run by the computer system, and allowing data of the second type to change data of the first type when it is determined that the trusted session is being run by the computer system.

In light of the foregoing comments, it will be recognized that the present disclosure provides a system and method for controlling hard drive data from unauthorized and authorized change in data, in a program, or in a desired configuration.

The present disclosure provides a system and method for controlling hard drive data change that allows a computer or a computer network to be safely connected to another network such as the Internet.

The present disclosure is directed to a system and method for controlling hard drive data change that allows a computer or a computer network to be safely exposed to viruses such as malware, spyware, key loggers, worms, adware, and Trojan horses.

The present disclosure provides a system and method for controlling hard drive data change that allows an IT professional to experiment with different system settings, upgrade a software version, or change the configuration of a computer system or the computer network without fear of permanent damage to the computer system or the computer network.

The present disclosure is also directed to a system and method for controlling hard drive data change that handles and stores data in a computer by establishing zones, portions, or sessions having different levels of write protection to prevent attempted changes to data stored in the zones, portions, or sessions.

The present disclosure further provides a system and method for controlling hard drive data change that is capable of restoring the hard drive to an initial configuration.

The present disclosure provides a system and method for controlling hard drive data change by preventing the hard drive from being compromised by any type of malware, user error, malicious attack, or any unwanted behavior.

The present disclosure is also directed to a system and method for controlling hard drive data change by eliminating the need to reimage the hard drive.

The present disclosure further provides a system and method for controlling hard drive data change that creates a virtual space on the hard drive where all unwanted changes are placed that allows an individual to perform daily tasks without compromising the integrity of the system.

The present disclosure is also directed to a system and method for controlling hard drive data change that allows information technology professionals to manage various computers or a network of computers such as lab computers or computers in a school, library, corporate, or government environment.

These and other advantages of the present system and method for protecting a hard drive will become apparent after considering the following detailed specification in conjunction with the accompanying drawings, wherein:

DETAILED DESCRIPTION

Figure 1:
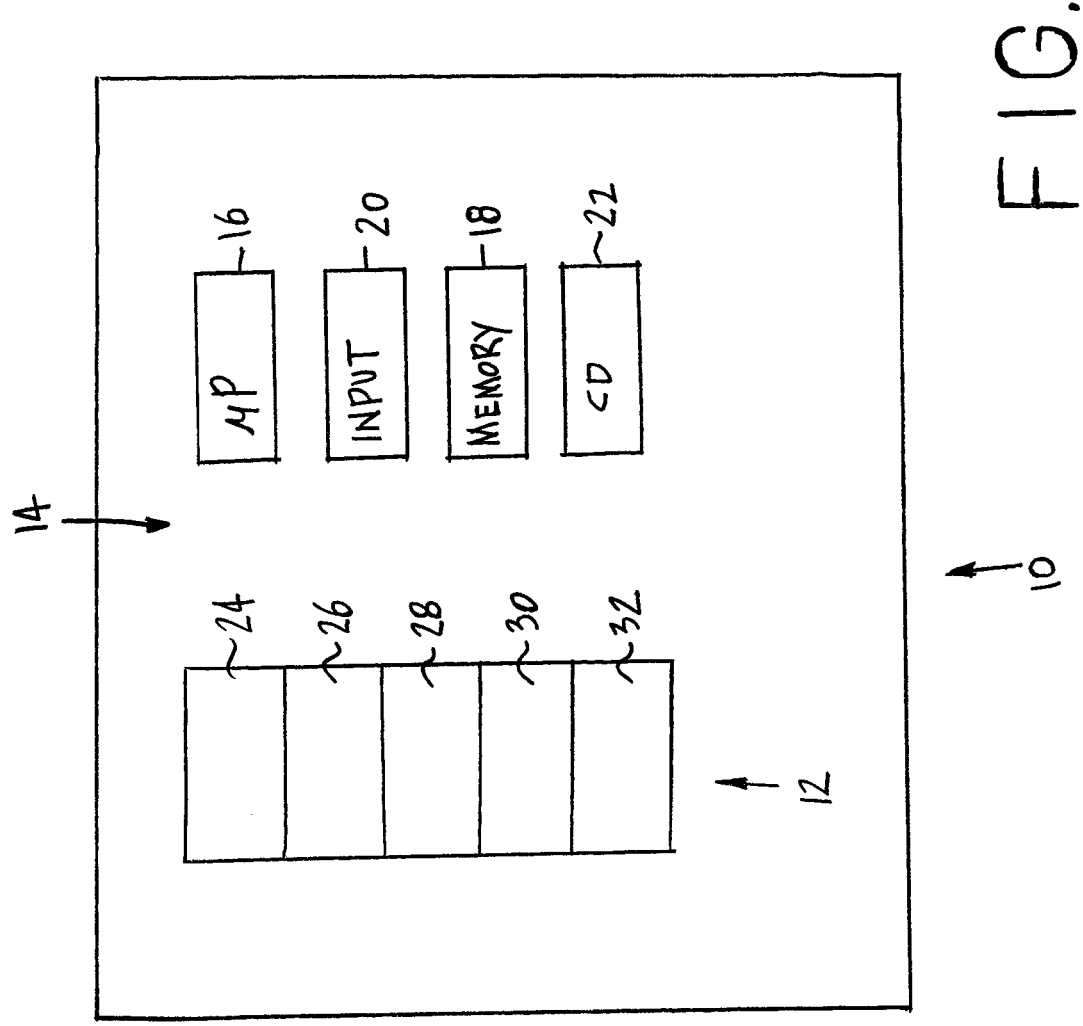
FIG. 1 is a block diagram of a system for controlling hard drive data change constructed according to the present disclosure.

Referring now to the drawings, wherein like numbers refer to like items, number 10 identifies a system for controlling hard drive data change constructed according to the present disclosure. With reference now to FIG. 1, the system 10 is shown to comprise a hard disk drive or a hard drive 12 that is part of a computer system 14. The computer system 14 may comprise a microprocessor 16, a memory 18, an input device 20 such as a mouse or a keyboard, and a CD-ROM drive 22. Other ancillary devices, which are not shown, may be included such as a printer, a scanner, a modem, a router, a portable storage device, or other network devices that allow the computer system 14 to be connected to other computer systems, a network, or the Internet. The hard drive 12 has a master boot record 24, meta data 26, a first partition 28, a second partition 30, and meta data backup 32. The partitions 28 and 30 may include an operating system, other software or applications, one or more volumes, and user data. It is also possible that the hard drive 12 may have other partitions. The main boot record 24 may include information concerning the partitions 28 and 30. The operating system organizes data into directories and this data is saved on the hard drive 12 as a file.

Change in data to the disk drive 12 may be controlled in the following manner. A first volume is created on the disk drive 12 which has data of a first type stored therein. The data of the first type is data that is never changed. A second volume is also created on the disk drive 12 which has data of a second type stored therein. The data of the second type is data that may be changed. The first volume and the second volume may both be within the first partition 28 or the second partition 30. It is also possible that the first volume is in the first partition 28 and the second volume is in the second partition 30. The computer system 14 is capable of being restarted which also restarts the hard drive 12. An application or software program is provided for running on the computer system 14 for determining whether data of the second type is attempting to change data of the first type to store data of the second type in the second volume, for determining whether data of the second type has been stored in the second volume, and for erasing data of the second type that has been stored in the second volume when the hard drive 12 is restarted by the computer system 14.

The first volume is write protected and data of the first type is never changed. The second volume is not write protected and data of the second type may be changed. Although, as will be explained further herein, the first volume may have data of the first type rewritten when authorization is provided. In essence, the first volume is a protected zone in which the data of the first type is protected from corruption, change, or erasure. The second volume may have data of the second type rewritten, corrupted, changed, or erased. The second volume is a temporary storage for data that has been identified by the program as being changed in such a manner that it should be erased, disregarded, or ignored upon restarting of the computer system 14. When an attempt is made to change data of the first type stored in the first volume, the attempted change is written to and read from the second volume as data of the second type. When the computer system 14 is restarted, the data of the second type that is stored in the second volume is erased, disregarded, or ignored. It is also possible and contemplated to have a third volume having data of a third type stored therein. The data of the third type is data that is changed relatively frequently. Reads from and writes to data of the third type stored in the third volume are performed in a substantially conventional manner and changes to it are not affected by restarting the computer system 14.

As indicated above, data of the second type is capable of being read from the second volume until erased. More specifically, while the data of the second type is present in the second volume, the computer system 14 behaves as though the attempted change to the original, protected data, data of the first type was successful. Whenever a call is made to read the data of the first type from the first volume, the data of the second type is read from the temporary or second volume, and the change data or data of the second type is then used by whatever operation made the call. Also, when a request is made to write data to the first volume, the data is written to the second volume because no change will be made to the first volume.

When the computer system 14 is first turned on, a series of operations occurs to prepare the computer system 14 for use. One of the first operations is a POST (power on self test) which involves identifying hardware associated with or connected to the computer system 14. The POST is followed by the boot, which involves loading a portion of the kernel which includes a kernel disk driver and a hardware abstraction layer (HAL). The kernel disk driver analyzes the hard drive 12, builds a table of disk space allocated for the kernel disk driver to use, builds a table for mapping disk sectors, and determines a disk protection scheme. The kernel disk driver will intercept all disk read/write requests from the operating system. Based on the disk protection scheme, the kernel disk driver will determine if read/write requests should be redirected to different addresses or to the second volume. As has been indicated, when an attempt is made to change data of the first type stored in the first volume, the attempted change is written to the second volume as data of the second type. The data of the first type stored in the first volume is not changed and the computer system 14 is in its original or initial state. The HAL involves abstracting specific hardware in order to make it appear generic with respect to, and therefore easier to use by an individual operating the computer system 14.

The kernel disk driver can also function as an upper filter on the hard drive 12. The driver uses an MFT (master file table) to find the temporary storage file, and, based thereon, builds a representative bitmap of the hard drive 12. When the computer system 14 is restarted, the representative bitmap is initialized. An initial call to read data stored in the first volume results in the data of the first type being read directly and exclusively from the first volume. When a call is made to write to or change the data of the first type stored in the first volume, the change is actually written to the second volume and the representative bitmap is updated to reflect this occurrence and establish the association between the original data or data of the first type stored in the first volume and the change data or data of the second type stored in the second volume. When a call is made to read data stored in the first volume, the representative bitmap directs the read to the data of the second type stored in the second volume, thereby making it seem as though the change to the data of the first type was successful. When the computer system 14 is restarted again, the data of the second type stored in the second volume is erased or ignored, the bitmap is re-initialized, and an initial call to read data of the first type stored in the first volume results in the original, unchanged data of the first type being read directly and exclusively from the first volume, thereby effectively "restoring" the original data or data of the first type. As has been indicated, it is also possible that some or all of the data of the second type stored in the second volume is ignored rather than erased when the computer system 14 is restarted.

As can be appreciated, the first volume is analogous to a vault in which important data is stored and protected from malicious, accidental, or otherwise undesired change. This data may include, for example, system settings, non-active or non-changing files, installed software, and any other data which the user may desire to protect. Whenever the user desires to add new data to the first volume, or to change data already located there, the protection provided by the system 10 must be either circumvented or temporarily disabled by use of personal identification information such as a password, biometric, or physical mechanism, in order to make the change.

The second volume is analogous to a chalkboard on which change data is written to and read from but which is erased substantially automatically whenever the computer system 14 is restarted. This data may include data downloaded, knowingly or unknowingly, by the user, unimportant or unknown files, dangerous viruses, and willful or accidental attempts by the user to change data stored in the first volume. If the second volume becomes full, an error message may be sent to the computer user through use of a display associated with the computer system 14 to indicate that the computer system 14 must be restarted in order to empty or free some space within the second volume. The user may be allowed to manually set the size of the second volume or the application may substantially automatically re-size the second volume as needed. In particular, the application can determine the size of the first volume and the second volume. Once determined, the application will make the second volume as large as possible. There may be some situations when have a large second volume is not necessary. In this case, the application will allow a user of the computer system 14 to manually select the size of the second volume.

If present, the third volume can contain data of the third type which may be changed, updated, edited, altered, added, or deleted, relatively frequently. The data of the third type may include temporarily installed software, trial software; active or changing files such as images, movies, music, e-mail, electronic documents such as text or spreadsheet documents, and many user settings. As indicated, reads and writes to data of the third type are performed normally, and changes to data of the third type are not affected by restarting the computer system 14. Thus, unlike data of the first type stored in the first volume, data of the third type stored in the third volume is not write-protected against change, and unlike data of the second type stored in the second volume, data of the third type stored in the third volume is not erased during restart.

It will be appreciated that any number of each type of volumes may be established. Furthermore, volumes of the same type may have different levels of write protection. For example, a High-Level Volume may be established which can only be changed by a particular user with high-level access rights, while a Medium-Level Volume may be established which can be changed by one or more users with medium-level access rights.

As previously indicated above, data of the first type stored in the first volume can be changed. The system 10 may further include an additional restoration feature operable to reverse such changes. In one embodiment, with protection enabled, data of the second type is written to the second volume along with tracking information associating the data of the second type with the corresponding data of the first type stored in the first volume. As desired, and with appropriate safeguards, such as requiring entry of a password, the user can accept, or commit, the data of the second type by moving it to the first volume. For example, if it is determined that the data of the second type is free of any virus then the data of the second type can be safely written to the first volume upon entry of a password.

By way of example only, the above-described embodiment of the system 10 may operate and be used substantially as follows. The computer program is stored on a computerreadable memory and executed by the computer system 14. First, the user verifies the configuration of the computer system 14. Although the configuration, including data of the first type in the first volume can be changed after installation of the computer program and enabling of the protection it provides, it is may be easiest to begin with the desired configuration. Thus, prior to installing the computer program, all viruses or malware should be removed, all system settings should be set as desired, the hard drive 12 should be defragmented, and, generally, the configuration of the computer system 14 should be checked and changed as desired. Next, the user installs the computer program to create the first volume and the second volume. The time required to install the computer program may depend on such considerations as, for example, the amount of information being located in the first volume and the second volume. The user will be requested by the program to create a password that will be used to enable, disable, and make certain changes to the operation of the computer program.

Once the user reboots the computer system 14 after installation of the computer program, the protection provided by the system 10 will be enabled after certain actions are taken by the user. When the computer system 14 completes its first reboot after installation of the computer program, the computer program is initially disabled, as indicated by a red Disabled Icon located in a system tray or other onscreen toolbar depicted in a display associated with the computer system 14. Selecting this icon opens an interface which allows the user to, among other things, enable the protection as well as make certain changes to the operation of the computer program. When the protection is enabled, a green Enabled Icon replaces the red Disabled Icon in the system tray. Thereafter, the program operates as described above to substantially automatically handle and store data of the first type in the first volume and data of the second type in the second volume. For example, any unauthorized changes made to the computer system 14 will not change the first volume when the computer system 14 and the hard drive 12 are restarted.

At any time after installation of the program, the user can set the size of the second volume. This is accomplished by double-selecting the displayed Enabled or Disabled Icon to cause an interface window to appear, in which, among other things, the size can be changed by, for example, entering a numerical value or by manipulating a virtual sliding bar mechanism. In one embodiment, the size can only be changed while protection is disabled.

Figure 2:
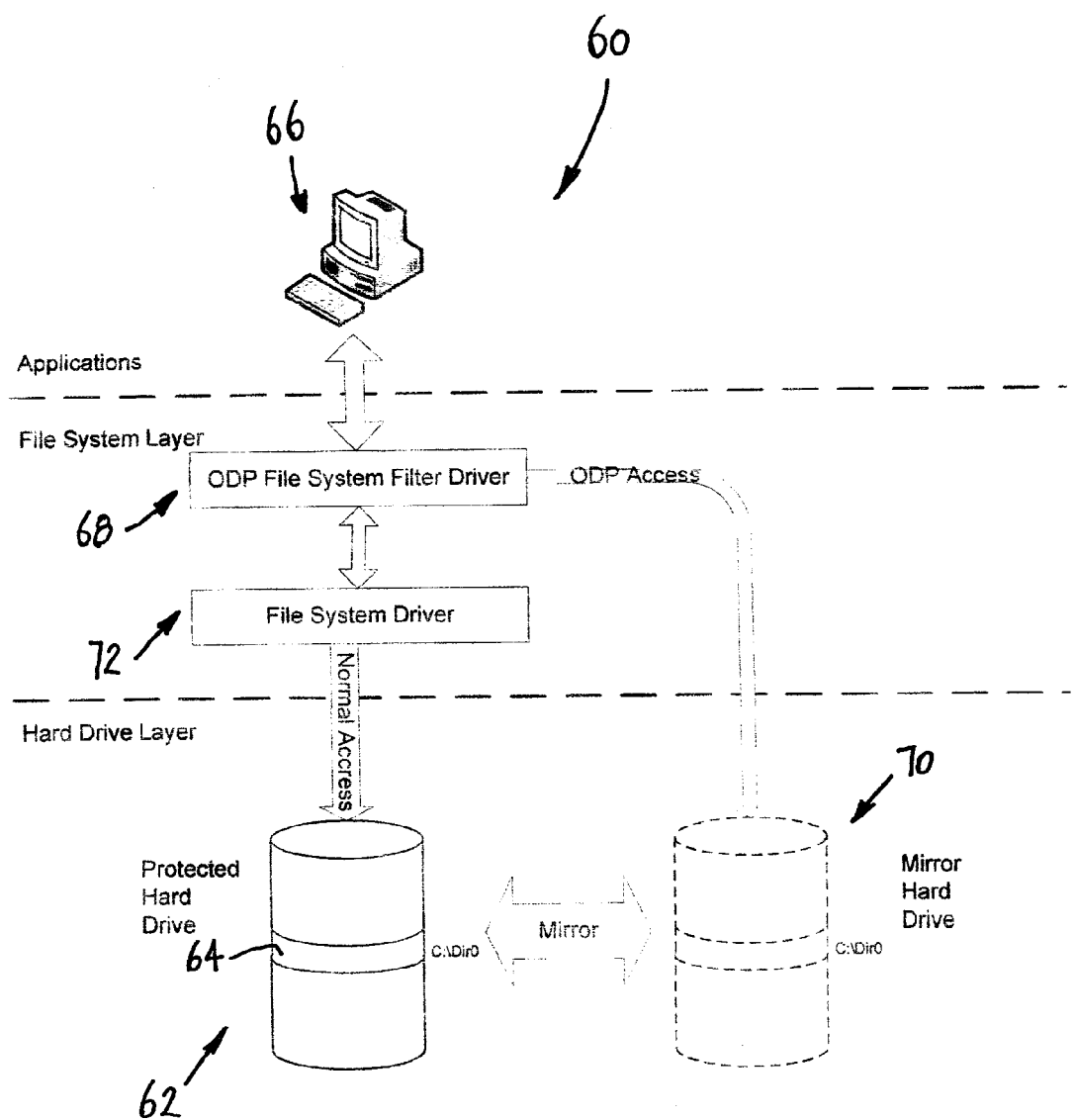
FIG. 2 is a block diagram of another embodiment of a system for controlling hard drive data change constructed according to the present disclosure.

FIG. 2 illustrates another embodiment of a system 60 for controlling disk drive data change constructed according to the present disclosure. Change in data to a disk drive 62 may be controlled at the directory level in the following manner by use of a directory protection module. A first directory 64, also known as directory 0, is created on the disk drive 62 which has data of a first type stored therein. The data of the first type is data that is never changed. Although not shown a second directory is also created on the disk drive 62 which has data of a second type stored therein. The data of the second type is data that may be changed. The directory protection module allows a computer system 66 to save one or more files to a specific directory permanently. In this manner, the computer user has more control over what can be permanently saved to the disk drive 62. When the directory protection is enabled, a program loaded on the disk drive 62 will register a file system filter driver (FSF) 68 and create an internal mirror image or mirror hard drive 70 of the hard drive 62 which can be read/write directly. The FSF 68 will inspect all file requests. If the requests are targeted to an object under the directory protection, the FSF 68 will redirect the requests to the mirror hard drive 70. The file requests may also pass through a file system driver 72 and change data of the first type on the hard drive 62 permanently.

The computer system 66 may be the same as the computer system 14 and the details will not be repeated here. The hard drive 62 has stored thereon an operating system and other software or applications. The computer system 66 is capable of being restarted which also restarts the hard drive 62. An application or software program is provided for running on the computer system 66 for determining whether data of the second type is attempting to change data of the first type to store data of the second type in the second directory, for determining whether data of the second type has been stored in the second directory, and for erasing or ignoring data of the second type that has been stored in the second directory when the hard drive 62 is restarted by the computer system 66. Each of the directories has its own level of write protection. It is possible and contemplated that more directories may be used. For example data of a third type may be stored in a third directory. Data of the third type is data that is changed relatively frequently. Reads and writes to data of the third type stored in the third directory are performed in a substantially conventional manner, and changes to it are not affected by restarting the computer system 66. It is also possible that the size of the second directory may be manually adjusted or selected by a user of the computer system 66.

Another way of controlling disk drive data change of either the system 10 or the system 60 is to use a trusted session to identify data. A session is a procedure started when the computer system is turned on until the computer system is rebooted or shutdown. This is one life cycle of the operation of the computer system. A trusted session is a session in which all of the computer operation is conducted professionally. All the hard drive data change during this session is considered acceptable. For example, applying an update to a software application is considered safe and acceptable. If the computer system is started, an update is loaded, and then the computer system is shut down then this session is considered to be trusted. In order to perform a trusted session, the application for controlling hard drive data change is disabled. In this case, all data change written to the hard drive will be permanent.

Figure 3:
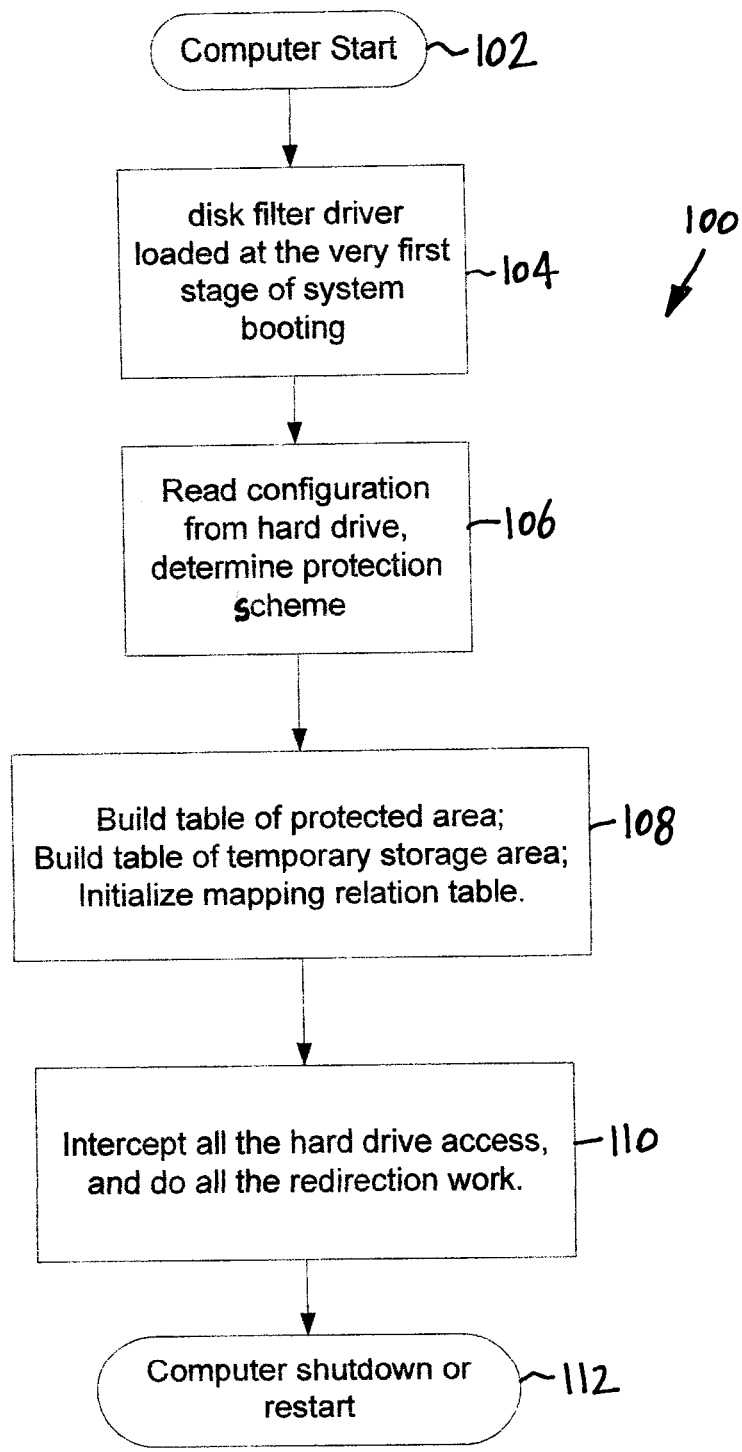
FIG. 3 is a flowchart diagram of steps involved in implementing a kernel disk driver.

FIG. 3 shows a flowchart diagram of steps 100 that may be used for implementing a kernel disk driver. In a first step 102, the computer system 14 is started. As has been previously indicated, there are various other steps included in this step 102. In a next step 104, the disk filter driver is loaded at the very first state of the computer system 14 booting. By way of example only, some other steps included in the step 104 may be the computer system 14 running through the POST followed by loading the boot which includes loading the kernel disk driver and the HAL. In a next step 106, the configuration of the hard drive is read and a protection scheme is determined. Once step 106 has been completed, a table of protected area is built in a step 108. The step 108 also includes building a table of temporary storage area and initializing mapping of a relation table. In a next step 110, all the hard drive access is intercepted and all redirection is accomplished. Finally, in a step 112, the computer system is shutdown or restarted. When the computer system 10 is restarted any data of the second type that is stored in the second volume will be disregarded, ignored, or erased. For purposes of this disclosure, erased means that the data is disregarded, ignored, or erased. This means that when the computer system is restarted the data may be disregarded, ignored, or physically erased. In view of this, the disregarded, ignored, or erased data will have no impact on the computer system or will not be able to change the computer system.

Figure 4:
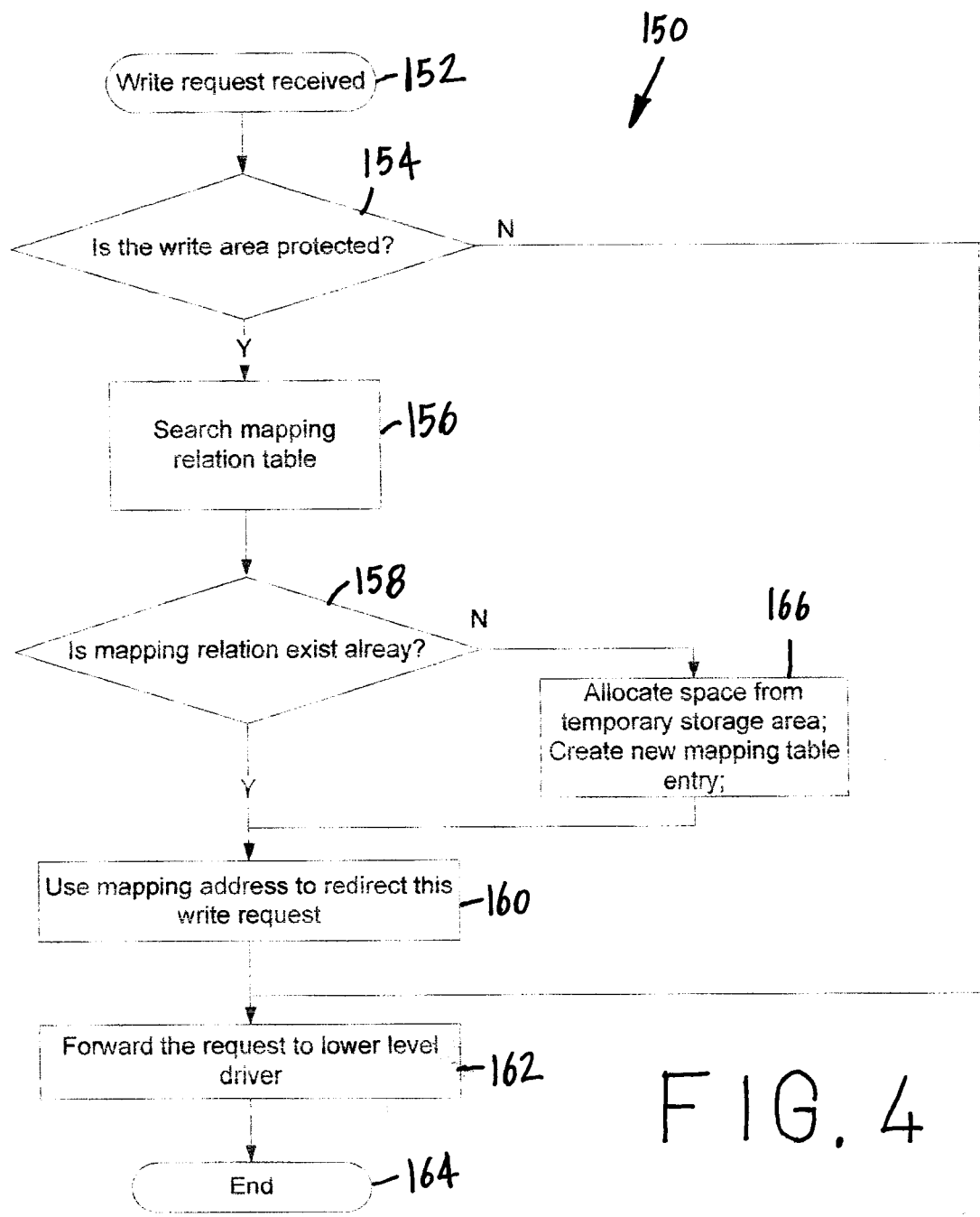
FIG. 4 is a flowchart diagram of steps involved in implementing a write request.

With reference now to FIG. 4, a flowchart diagram of steps 150 that may be used when a write request is received by the system 10 is shown. In a first step 152, a write request is received. In a next step 154, it is determined whether the requested write area is protected. If it is determined that it is then control continues to a next step 156. In the step 156 a search of the mapping relation table is made. Once the search is completed, a decision concerning whether the mapping relation already exists is made in a step 158. If it is decided that the mapping relation does exists then control move on to a step 160. In the step 160 the mapping address is used to redirect the write request. In a next step 162, the request to a lower level driver is forwarded. Finally, in a step 164, the write request is ended. If it is determined in the step 154 that requested write area is not protected then control is advanced to the step 162. Also, if in the step 158 it is determined that the mapping relation does not exist then a step 166 is encountered. The step 166 will allocate space from temporary storage area and then create a new mapping table entry. Once this is completed control advances to the step 160.

Figure 5:
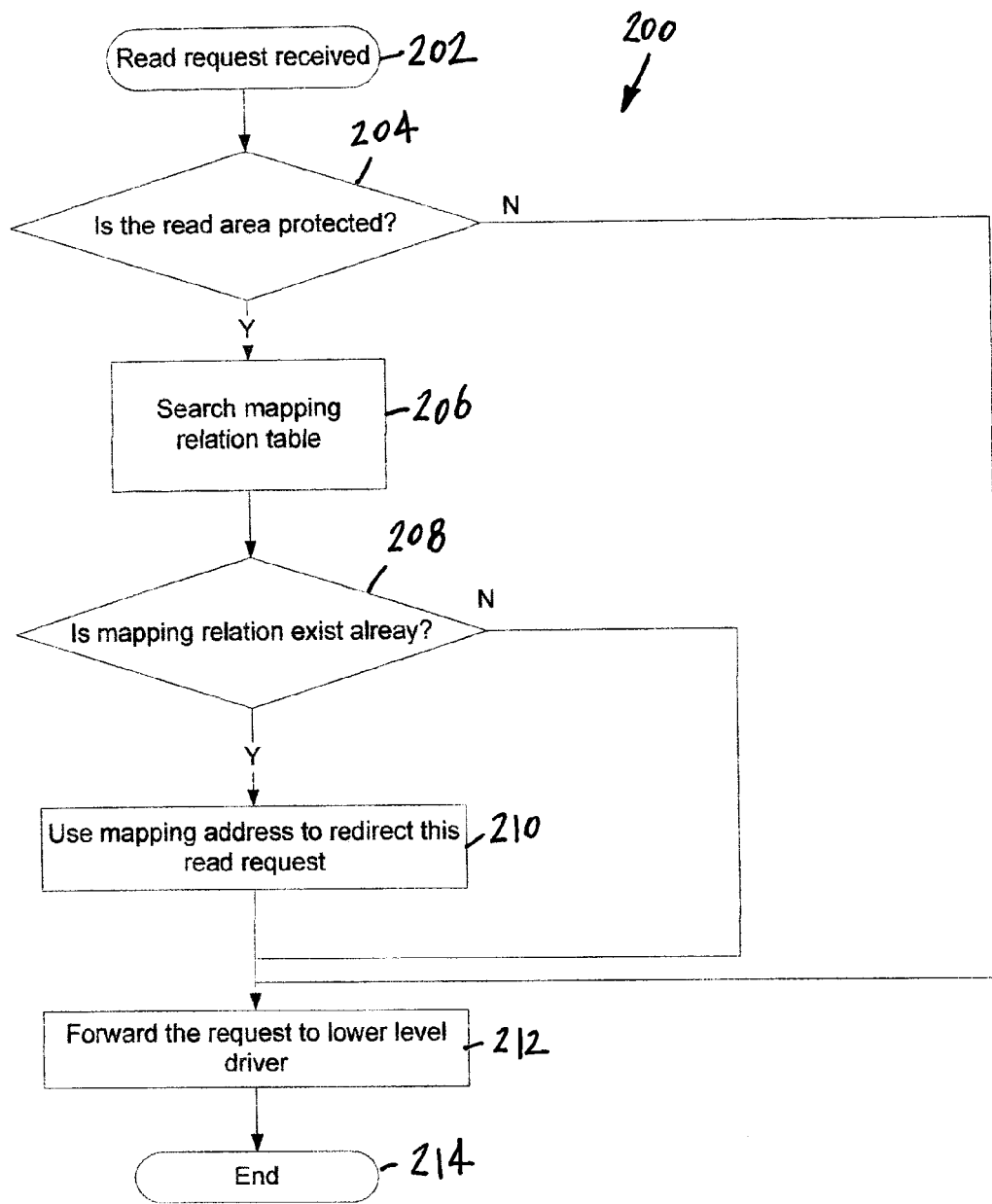
FIG. 5 is a flowchart diagram of steps involved in implementing a read request.

FIG. 5 illustrates a flowchart diagram of steps 200 that may be used for when a read request is desired. In a first step 202, a read request is received. In a next step 204 it is determined whether the read area is protected. If it is determined that the read area is protected then a search of the mapping relation table is made in a step 206. Once the search is completed, it is determined whether the mapping relation already exists in a step 208. If it it determined that the mapping relation does exists then the mapping address is used to redirect the read request, as is indicated in a step 210. In a next step 212, the request to a lower level driver is forwarded. Finally, in a step 214, the read request is ended. If it is determined in the step 204 that the requested read area is not protected then control is advanced to the step 212. Also, if in the step 2088 it is determined that the mapping relation does not exist then control advances to the step 212.

The systems 10 and 60 may also include a restoration feature operable to reverse changes to data. One way to reverse changes made during the current session is to not accept them or to leave them as though stored in a volume or a directory such that they are erased during restart. More generally, because each session is associated with its own representative bitmap which links the data of the previous session to the changes made in the subsequent session, it is possible to revert to any previous session by reinitializing the bitmaps of all subsequent sessions, thereby effectively erasing the change data associated with those subsequent sessions and restoring the desired data.

The systems 10 and 60 are capable of handling and storing data in the computer system by establishing volumes or directories with each volume or directory having a different level of write protection. With the protection provided by the systems 10 and 60, the computer system can safely be connected to a network such as the Internet, download files, expose the computer system to malware such as viruses, spyware, key loggers, worms, adware, and Trojan horses, experiment with different system settings, and otherwise expose the configuration of the computer system to change without fear of permanent damage.

From all that has been said, it will be clear that there has thus been shown and described herein a system and method for controlling hard drive data change which fulfills the various advantages sought therefore. It will become apparent to those skilled in the art, however, that many changes, modifications, variations, and other uses and applications of the subject system and method for controlling hard drive data change are possible and contemplated. All changes, modifications, variations, and other uses and applications which do not depart from the spirit and scope of the disclosure are deemed to be covered by the disclosure, which is limited only by the claims which follow.

What is claimed is:

1. A system for controlling hard drive data change comprising:
   a hard drive having a first directory and a second directory, the first directory for storing data of a first type, the second directory for storing data of a second type, the hard drive being connected to a computer system which restarts the hard drive;
   a mirror hard drive;
   a file system filter driver for inspecting a file request and for determining whether the file request is targeted to a protected object and for redirecting the file request to the mirror hard drive when the file system filter driver determines that the file request is targeted to the protected object;
   a file system driver for receiving the file request from the file system filter driver when the file system filter driver determines that the file request is not targeted to the protected object; and
   an application for running on the computer system for determining whether data of the second type is attempting to change data of the first type to store data of the second type in the second directory, for determining whether data of the second type has been stored in the second directory, and for erasing data of the second type that has been stored in the second directory when the hard drive is restarted by the computer system.

2. The system for controlling hard drive data change of claim 1 wherein the first directory is protected.

3. The system for controlling hard drive data change of claim 1 wherein the second directory is not protected.

4. The system for controlling hard drive data change of claim 1 wherein the second directory has a size and the size is adjustable.

5. The system for controlling hard drive data change of claim 1 wherein the second directory has a size and the size is automatically adjusted by the application.

6. The system for controlling hard drive data change of claim 1 wherein the second directory has a size and the application tracks data of the second type that is stored in the second directory and when data of the second type that is stored in the second directory is equal to the size the application will generate an error message.

7. The system for controlling hard drive data change of claim 1 wherein the file system driver changes data of the first type in the first directory when the file system filter driver determines that the file request is not targeted to the protected object.

8. The system for controlling hard drive data change of claim 1 further comprising a kernel disk driver for analyzing the hard drive, for building a table of disk space allocated for the kernel disk driver to use, for building a table for mapping disk sectors, and for determining a disk protection scheme.

9. A system for controlling hard drive data change comprising:
   a hard drive having a first directory for storing data of a first type, a second directory for storing data of a second type, the hard drive being connected to a computer system which restarts the hard drive;
   an application for running on the computer system for determining whether data of the second type is attempting to change data of the first type to store data of the second type in the second directory, for determining whether data of the second type has been stored in the second directory, and for erasing data of the second type that has been stored in the second directory when the hard drive is restarted by the computer system;

a directory protection module for allowing the computer system to save data of the first type to the first directory permanently;

a mirror hard drive;

a file system filter driver for inspecting a file request and for determining whether the file request is targeted to a protected object and for redirecting the file request to the mirror hard drive when the file system filter driver determines that the file request is targeted to the protected object; and a file system driver for receiving the file request from the file system filter driver when the file system filter driver determines that the file request is not targeted to the protected object.

10. The system for controlling hard drive data change of claim 9 further comprising a kernel disk driver for analyzing the hard drive, for building a table of disk space allocated for the kernel disk driver to use, for building a table for mapping disk sectors, and for determining a disk protection scheme.

11. The system for controlling hard drive data change of claim 9 wherein the first directory is protected.

12. The system for controlling hard drive data change of claim 9 wherein the second directory is not protected.

13. The system for controlling hard drive data change of claim 9 further comprising a third directory for storing data of a third type.

14. The system for controlling hard drive data change of claim 9 wherein the second directory has a size and the size is adjustable.

15. A system for controlling hard drive data change comprising:

a hard drive having a first directory and a second directory, the first directory for storing data of a first type, the second directory for storing data of a second type, the hard drive being connected to a computer system which restarts the hard drive;

a mirror hard drive;

a file system filter driver for inspecting a file request and for determining whether the file request is targeted to a protected object and for redirecting the file request to the mirror hard drive when the file system filter driver determines that the file request is targeted to the protected object, the file system filter driver being capable of being disabled;

a file system driver for receiving the file request from the file system filter driver when the file system filter driver determines that the file request is not targeted to the protected object; and an application for running on the computer system for determining whether a trusted session is being run by the computer system, disabling the file system filter driver when the trusted session is being run, and allowing data of the second type to change data of the first type when it is determined that the trusted session is being run by the computer system.

16. The system for controlling hard drive data change of claim 15 wherein the first directory is protected.

17. The system for controlling hard drive data change of claim 15 wherein the second directory is not protected.

18. The system for controlling hard drive data change of claim 15 further comprising a third directory for storing data of a third type.

19. The system for controlling hard drive data change of claim 15 wherein the second directory has a size and the size is automatically adjusted by the application.

20. The system for controlling hard drive data change of claim 15 wherein the second directory has a size and the size is automatically adjusted by the application.

* * * * *